United States Patent [19]
Evans

[11] Patent Number: 6,141,972
[45] Date of Patent: Nov. 7, 2000

[54] INVASIVE CRYOGENIC TOOL AND METHOD FOR FREEZING THE CONTENT OF A PIPE

[76] Inventor: Daniel J. Evans, 1048 Barcelano Dr., Kissimmee, Fla. 34741

[21] Appl. No.: 09/206,366

[22] Filed: Dec. 7, 1998

[51] Int. Cl.[7] ............................... F17C 9/02; F25D 3/00; F16L 55/18
[52] U.S. Cl. .................. 62/50.2; 62/293; 138/97
[58] Field of Search ..................... 62/50.2, 51.1, 62/293, 62, 66; 138/97

[56] References Cited

U.S. PATENT DOCUMENTS

| | | | |
|---|---|---|---|
| 2,483,082 | 9/1949 | Young et al. | 138/97 |
| 3,623,337 | 11/1971 | Tremont | 62/293 |
| 3,736,937 | 6/1973 | Basiulis | 62/293 X |
| 3,827,282 | 8/1974 | Brister | 73/40.5 |
| 3,926,006 | 12/1975 | Brooks et al. | 62/66 |
| 4,038,875 | 8/1977 | Walkotten | 73/425 |
| 4,211,231 | 7/1980 | Rzasa | 62/293 X |
| 4,314,577 | 2/1982 | Brister | 137/13 |
| 4,428,204 | 1/1984 | Brister | 62/62 |
| 4,441,328 | 4/1984 | Brister | 62/53 |
| 4,492,095 | 1/1985 | Brister | 62/293 |
| 4,944,161 | 7/1990 | Van Der Sanden | 62/293 |
| 5,680,770 | 10/1997 | Hall et al. | 62/293 |
| 5,852,938 | 12/1998 | Fuhr et al. | 62/129 |

*Primary Examiner*—William Doerrler
*Attorney, Agent, or Firm*—Liniak, Berenato, Longacre & White, LLC

[57] ABSTRACT

A cryogenic tool capable of freezing the pipe content which otherwise flows through a pipe is provided to permit isolation of a repair site in the pipe. The cryogenic tool comprises a tool body and a cryogenic device. The tool body has a tip which is adapted for insertion through a wall of the pipe. The tip is of sufficient length to extend entirely through the wall of the pipe and into the pipe content. The cryogenic device is connected to the tip. The cryogenic device is adapted to reduce the temperature of the tip sufficiently to freeze the content of the pipe in the vicinity of the tip. Also provided is a method of freezing the content of a pipe to prevent flow through the pipe. The method comprises the steps of: inserting a thermally conductive tip of a cryogenic tool through a wall of the pipe so that the cryogenic tool extends into the content; and applying a cryogenic fluid to the conductive tip so that heat from the content of the pipe is transferred through the tip to the cryogenic fluid, to vaporize the cryogenic fluid.

39 Claims, 2 Drawing Sheets

INVASIVE CRYOGENIC TOOL AND METHOD FOR FREEZING THE CONTENT OF A PIPE

BACKGROUND OF THE INVENTION

The present invention relates to a cryogenic/refrigerant tool and method for freezing the content of a pipe, preferably in an invasive manner. Hereinafter, the term "cryogenic" is used in its broadest sense. It encompasses not only subject matter involving super-cooled fluids, but also subject matter involving refrigerants instead of super-cooled fluids, regardless of whether applied using an open flow arrangement or a closed refrigeration loop.

There are various situations where it is desirable to terminate the flow of fluids through a pipe. One example involves defective valve replacement. When a valve leaks, routine maintenance of equipment, or replacement of the valve generally is not practical without shutting down the entire system and draining the pipe. Shutting down of the entire system, however, is not practical when critical operations must be maintained using the system.

A second example is where a valve was not installed in a branch line during original construction, but must be installed now in the pipe without shutting down the entire system. In either case, a freeze of the pipe contents would be desirable upstream and downstream of the desired valve site in order to prevent loss of fluid, chemical treatment, or both. In addition to advantageously avoiding drainage of the system, freezing would eliminate the need for refilling and venting of air from elements of the fluid network (e.g., heat transfer equipment and coils).

With the foregoing difficulties as a background, several devices and methods have been developed for plugging an existing pipe to stop the flow of fluid through the pipe. Some of those devices and techniques involve insertion of a plug through a hole in the pipe or otherwise, and in some cases, inflation of the plug after insertion. At least one device and technique involves freezing of the material which is used to inflate the plug and/or external application of a cooling device to the pipe which assists in freezing of the material in the plug.

Still other devices and techniques provide only a cooling device to an outside surface of the pipe. Such devices draw heat from the contents of the pipe, through the pipe itself, and eventually freeze the contents of the pipe to form a plug. Such devices and techniques, however, are not always effective or practical. When the content of the pipe continues to flow (e.g., because of leakage or otherwise), the heat introduced by the additional flow either prevents freezing, or extends the freezing time to such an extent that it becomes economically impractical.

Several problems also are associated with the conventional plugging techniques. With regard to the devices and techniques which insert a plug into the contents of the pipe, for example, the use of such devices and techniques is limited to those pipes which are compatible with the size and shape of the plug. If a wide range of pipe sizes and shapes are to be plugged, multiple plugs must be provided, each having a different size and/or shape. If the material which makes up the plug is flexible and/or the plug is inflatable, then care must be taken to ensure that such material is compatible with the contents of the various pipes into which the plugs will be inserted. The process of inserting and/or inflating the plug also can be rather complicated.

The devices and techniques involving application of a cooling device externally to the pipe also provide less than optimal results. In particular, heat from the contents of the pipe must be transmitted through the wall of the pipe. Such devices and techniques therefore can be slow and/or ineffective at freezing the contents of a pipe, especially when used on pipes which are constructed of more thermally insulative material and/or when the content of the pipes continues to flow, as indicated above.

There is consequently a need in the art for a device and/or method capable of locally preventing flow through a pipe, by freezing the content of pipe, without the need for insertion and inflation of a plug, and without being limited to thermally conductive pipes or pipes in which the content does not flow.

SUMMARY OF THE INVENTION

A primary object of the present invention is to overcome at least one of the foregoing problems with the conventional devices and techniques.

Another object of the present invention is to satisfy the need in the art for a device and method capable of locally preventing flow through a pipe, by freezing the content of the pipe, without the need for insertion and inflation of a plug.

Still another object of the present invention is to satisfy the need in the art for a device and method capable of locally preventing flow through a pipe, by freezing the content of the pipe, regardless of the whether the pipe is thermally conductive.

These and other objects of the present invention are achieved by providing a cryogenic tool capable of freezing the pipe content which otherwise flows through the pipe. The cryogenic tool comprises a tool body and a cryogenic device. The tool body has a tip which is adapted for insertion through a wall of the pipe. The tip is of sufficient length to extend entirely through the wall of the pipe and into the pipe content. The cryogenic device is connected to the tip. The cryogenic device is adapted to reduce the temperature of the tip sufficiently to freeze the content of the pipe in the vicinity of the tip.

According to another aspect of the present invention a cryogenic tool for freezing a pipe content which otherwise flows through the pipe comprises an elongated tool body and a cryogenic device. The elongated tool body has a hollow tip formed of thermally conductive material. The tip is adapted for insertion through a wall of the pipe and has sufficient length to extend entirely through the wall of the pipe and into the pipe content. The cryogenic device is connected to the hollow tip. When in operation, the cryogenic device transmits a cryogenic fluid through a conduit into the hollow tip. The hollow tip has a larger cross-sectional area than the conduit. Consequently, the cryogenic fluid expands during entry into the hollow tip and absorbs sufficient heat from the content via thermal conduction through the thermally conductive material to freeze the content of the pipe in the vicinity of the tip. A plug of the content is formed by such freezing which, in turn, prevents flow through the pipe.

The term "tip", as used herein, means the portion of the tool body which can extend into the pipe, not just the extreme end of the tool body.

The present invention also provides a method of freezing a content of a pipe to prevent flow through the pipe. The method comprises the steps of: inserting a thermally conductive tip of a cryogenic tool through a wall of the pipe so that the cryogenic tool extends into the content; and applying a cryogenic fluid to the conductive tip so that heat from the content of the pipe is transferred through the tip to the cryogenic fluid, to vaporize the cryogenic fluid.

The above and other objects and advantages will become more readily apparent when reference is made to the following description taken in conjunction with the accompanying drawings.

DESCRIPTION OF PREFERRED EMBODIMENTS

Figure 1:
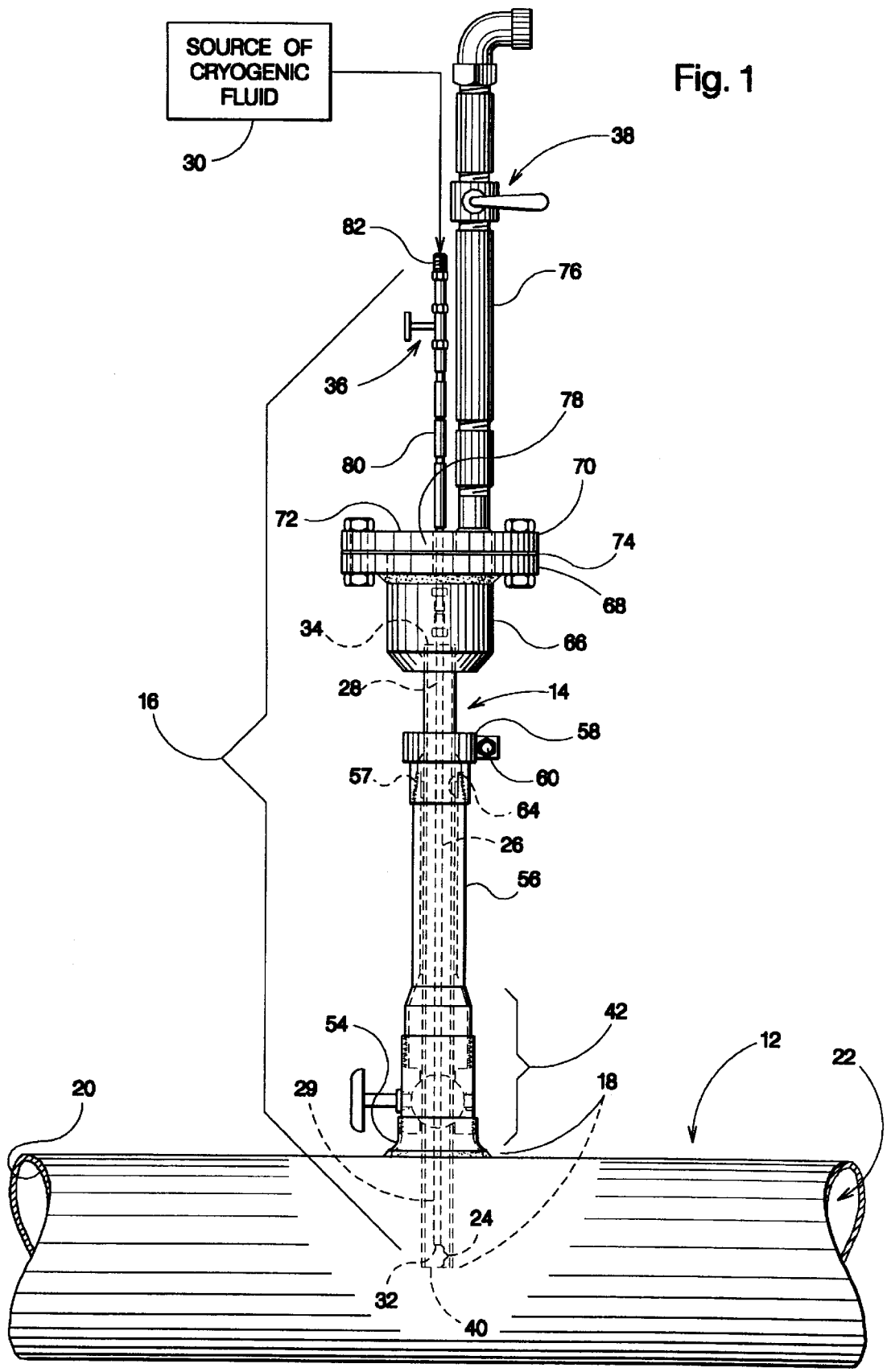
FIG. 1 is an elevation view of a cryogenic tool according to a preferred embodiment of the present invention, during application to a pipe.
Figure 2:
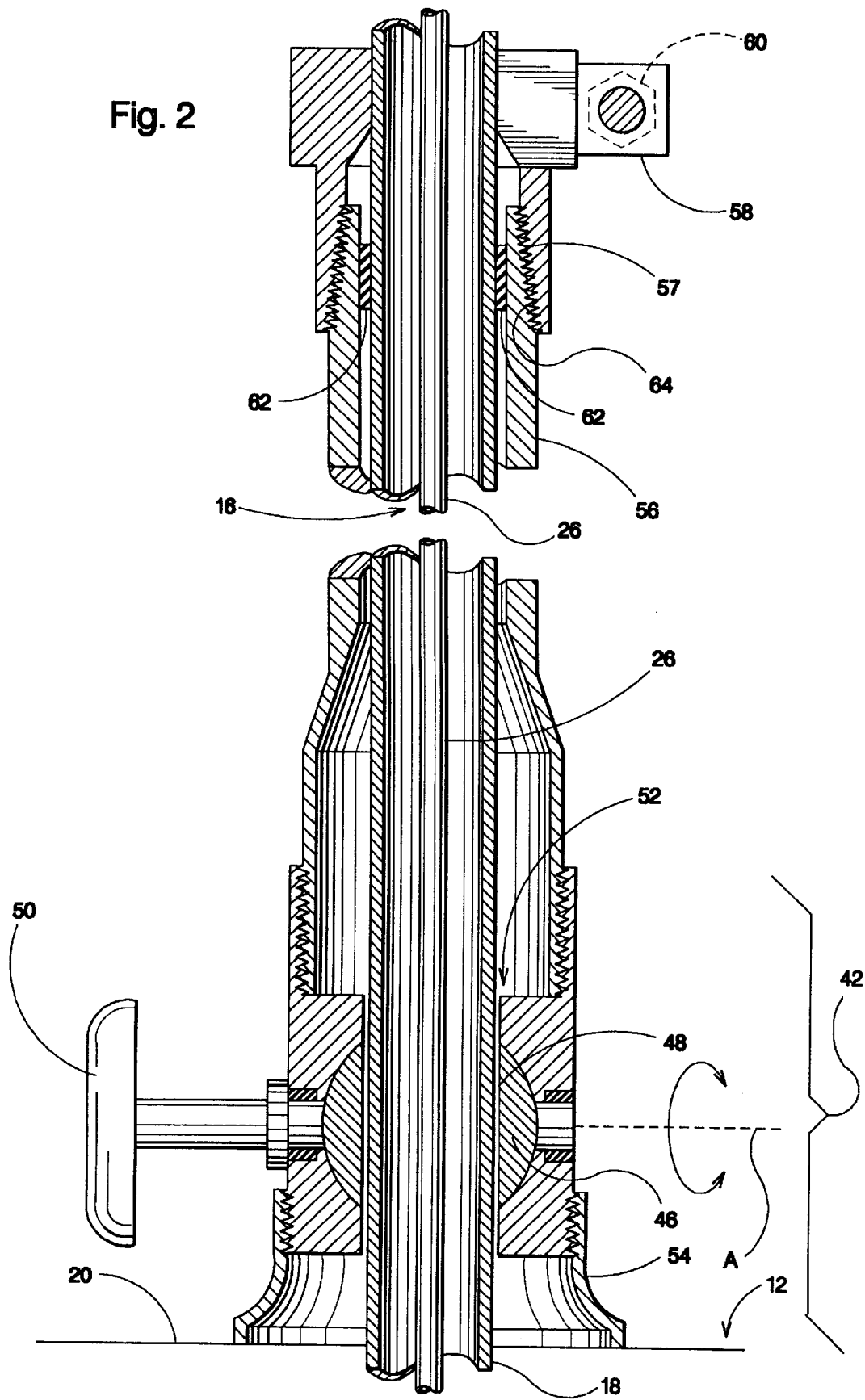
FIG. 2 is a fragmentary cross-sectional view of select portions of the cryogenic tool illustrated in FIG. 1.

FIGS. 1 and 2 illustrate a cryogenic tool 10 according to a preferred embodiment of the present invention. The tool 10 is shown in connection with a pipe 12. The pipe 12 has a content (e.g., a fluid) which normally flows through the pipe 12. While the content typically will be water or other liquids, it is understood that the present invention is not limited to use on pipes with such a content. The present invention thus may be practiced on pipes which carry other fluids, or any other substance which is susceptible to being frozen by the cryogenic capabilities of the present invention.

The exemplary cryogenic tool 10 comprises a tool body 14 and a cryogenic device 16. The tool body 14 preferably is elongated and has a tip 18 which is adapted for insertion through a wall 20 of the pipe 12. The tip 18 is of sufficient length to extend entirely through the wall 20 of the pipe 12 and into the pipe content 22. The cryogenic device 16 is connected to the tip 18 and is adapted to reduce the temperature of the tip 18 sufficiently to freeze the content 22 of the pipe 12 in the vicinity of the tip 18.

Preferably, an expansion device 24 is located at the tip 18. The cryogenic device 16 is adapted to provide cryogenic fluid to the expansion device 24, where the cryogenic fluid expands and absorbs heat transferred through the tip 18 from the content 22 of the pipe 12, to thereby freeze the content 22. While a preferred cryogenic fluid is liquid nitrogen, it will be appreciated that the invention is not limited to liquid nitrogen. The present invention can be implemented using cryogenic fluids other than liquid nitrogen, so long as such fluids are capable of achieving the desired results in the intended application of the tool 10.

Preferably, as shown in FIGS. 1 and 2, the cryogenic device 16 includes a conduit 26 having a proximal portion 28 and a distal portion 29. The distal portion 29 preferably is located at the tip 18.

The conduit 26 preferably is contained substantially within the tool body 14. The proximal portion 28 is connectable, at least indirectly, to a source 30 of cryogenic fluid. The conduit 26 communicates the cryogenic fluid from the proximal portion 28 to the distal portion 29. The distal portion 29 has at least one opening 32 through which the cryogenic fluid is discharged into the tip 18. Once discharged into the tip 18, the cryogenic fluid from the opening 32 absorbs heat from the content 22 via the tip 18, and vaporizes. The vaporization of the fluid advantageously draws more heat energy away from the content 22 because additional energy is required to change the phase of the fluid to a gas under the law of enthalpy.

The tip 18 preferably is hollow. The cryogenic fluid flows through the conduit 26 into the hollow tip 18. The hollow tip 18 has a larger cross-sectional area than the conduit 26, whereby the cryogenic fluid expands during entry into the hollow tip 18 and absorbs sufficient heat from the content 22 via thermal conduction through the thermally conductive material to freeze the content 22 of the pipe 12 in the vicinity of the tip 18 and thereby form a plug of the content 22 itself. This plug, in turn, prevents flow through the pipe 12.

The tip 18 preferably is made of thermally conductive material which facilitates the transfer of heat from the content 22 of the pipe 12 to the cryogenic fluid which is discharged into the tip 18. A preferred thermally conductive material is copper. It is understood, however, that the invention is not limited to copper and can be practiced using other materials which are sufficiently thermally conductive to achieve freezing of the content 22 in the intended applications of the tool 10.

While the tip 18 and tool body 14 have a cylindrical shape in the illustrated embodiment, it is understood that the invention is not limited to such a shape. The tip 18 and/or tool body 14, for example, can be provided with an undulating or other type of relief surface which increases the surface area of the tip 18 and/or tool body 14 and which thereby increases the rate of heat transfer from the content 22 to the cryogenic fluid inside the tip 18.

The tool body 14 also is hollow and has an exhaust port 34 through which the cryogenic fluid exits after being discharged into the tip 18 and absorbing heat therefrom. The exhaust port 34, as shown in FIG. 1, is located on the tool body 14, away from the tip 18.

The tool 10 preferably includes a fluid control valve 36 which is connected, at least indirectly, to the conduit 26. The fluid control valve 36 may be implemented using one of several conventional valves (e.g., gate valves) and is operable to selectively open, restrict, and close the conduit 26 to flow of the cryogenic fluid.

The illustrated fluid control valve 36 is a manually operable valve. It is understood, however, that an automatically actuated valve can be implemented in place of, or in addition to, the valve 36 shown in FIG. 1. An automatically actuated version of the fluid control valve 36 can be implemented using, for example, one or more sensors and a valve control circuit (not shown). The sensors, for example, can include a temperature sensor at or near the tip 18 and/or a flow sensor which is responsive to the flow of content 22 through the pipe 12. An exemplary valve control circuit can be programmed or otherwise arranged to terminate or restrict the flow of cryogenic fluid through the valve 36 when the temperature drops to a predetermined minimum value and/or when the flow through the pipe 12 stops or slows down to a predetermined minimum flow rate. It also may be programmed or otherwise arranged to permit the flow of cryogenic fluid through the valve 36 when the temperature is above a predetermined temperature value and/or when the content 22 flows through the pipe, or at least flows at a predetermined rate.

The tool 10 also may include an exhaust control valve 38 which is connected, at least indirectly, to the exhaust port 34. The illustrated exhaust control valve 38 is a manually operable valve. It is understood, however, that an automatically actuated valve can be implemented in place of, or in addition to, the valve 38 shown in FIG. 1.

An automatically actuated version of the exhaust control valve 38 can be implemented using, for example, one or more sensors and a valve control circuit (not shown). The sensors, for example, can include a temperature sensor at or near the tip 18 and/or a flow sensor which is responsive to the flow of content 22 through the pipe 12. An exemplary valve control circuit can be programmed or otherwise arranged to terminate or restrict the flow of vaporized cryogenic fluid through the exhaust control valve 38 when the temperature drops to a predetermined minimum value and/or when the flow through the pipe 12 stops or slows down to a predetermined minimum flow rate. It also may be programmed or otherwise arranged to permit or increase the flow of cryogenic fluid through the valve 38 when the temperature is above a predetermined temperature value and/or when the content 22 flows through the pipe, or when it at least flows at a predetermined rate. Notably, the position of the valve 38 controls the rate at which the vaporized cryogenic fluid escapes through the exhaust port 34, and to some extent also controls the flow of cryogenic fluid through the tip 18 and the tool body 14. The exhaust control valve 38 can be provided in addition to, or as an alternative to, the fluid control valve 36.

Preferably, the distal end 40 of the tip 18 is closed so that the cryogenic fluid cannot escape into the pipe 12 and cannot contaminate the content 22 of the pipe 12. This also advantageously permits recovery of the cryogenic fluid should such recovery become desirable.

As best shown in FIG. 2, the cryogenic tool 10 preferably includes an attachment mechanism 42. The attachment mechanism 42 is capable of securely attaching the tool body 14 to the pipe 12. Preferably, the tool body 14 is connected to the attachment mechanism 42 in a telescopic manner. The tool body 14 therefore can be telescopically moved through the attachment mechanism 42.

Preferably, the attachment mechanism 42 includes a tapping valve 44. The tapping valve 44 in the illustrated embodiment is implemented using a ball valve. It is understood, however, that the attachment mechanism 42 may be implemented with alternative valve structures. In this regard, the attachment mechanism 42 is not limited to ball valves.

The valve 44 includes a ball 46 which is rotatably held within the valve 44. A tunnel 48 extends diametrically through the ball 46. Connected to the ball 46 is a handle 50 which can be manually turned about an axis A to effect rotation of the ball 46 within the valve 44. In FIG. 1, the valve 44 is shown in its open position. In the open position, the tunnel 48 is aligned with a passageway 52 through the valve 44. In the closed position, by contrast, the ball 46 is rotated ninety (90) degrees and therefore is transverse to the passageway 52. The ball 46 therefore blocks the passageway 52 when the valve 44 is in its closed position.

The attachment mechanism 42 further includes a tubular wet-tap 54 which is welded, or otherwise securely attached, to the pipe 12. The valve 44 is threadedly or otherwise connected to the wet-tap 54. Once this connection is achieved, it is possible to open the valve 44 and insert a drill or other hole opening device through the passageway 52 and tunnel 48 and into engagement with an outside surface of the pipe 12. The hole opening device then can be activated to create a hole in the wall 20 of the pipe 12. The hole opening device then can be withdrawn, and the valve 44 can be closed to block access through the valve 44 to the hole in the wall 20 of the pipe 12 and to keep the contents 22 from escaping through the hole.

The cryogenic tool 10 also includes a tubular adapter 56. The tubular adapter 56 is threadedly or otherwise connected to the valve 44, opposite to the wet-tap 54. The tubular adapter 56 has tapered threads 57 of progressively decreasing diameter in a direction away from the valve 44.

A locking element 58 is operatively connected between the tool body 14 and the attachment mechanism 42. The locking element 58 is adapted to selectively lock the tool body 14 in a positional relationship with respect to the attachment mechanism 42 after such a positional relationship is telescopically achieved. The tool body 14 is configured to fit through the locking element 58, through the tubular adapter 56, through the passageway 52, through the tunnel 48, through the wet-tap 54, through the hole in the wall 20 of the pipe 12, and into the content 22 of the pipe 12. When the locking element 58 is not locked, the extent to which the tool body 14 extends into the pipe 12 advantageously is adjustable to accommodate pipes having different diameters. The locking element 58 then can be locked when a desired amount of extension into the pipe 12 is achieved.

Although other locking elements can be used, the illustrated locking element 58 has a split ring configuration. Telescopic movement of the tool body 14 through the locking element 58 can be achieved by loosening a fastener 60 which secures one end of the split ring configuration to another. The split ring configuration thereby expands and loosens its grip on the tool body 14. After the desired positional relationship is achieved by telescopic movement of the tool body 14, the fastener 60 can be tightened to constrict the split ring configuration of the locking element 58 tightly around the tool body 14. This, in turn, releasably locks the position of the tool body 14 with respect to the attachment mechanism 42.

Preferably, the tool body 14 and its tip 18 are diametrically movable into the pipe 12 and have sufficient length to span an interior diameter of the pipe 12. The cryogenic device 16 preferably is adapted to reduce the temperature of the tip 18 sufficiently to freeze the content 22 and completely block flow through the pipe 12.

According to the illustrated embodiment, an annular gasket 62 is located circumferentially around the tool body 14, between the tubular adapter 56 and the tool body 14. The gasket 62 is located under the tapered threads 57. Correspondingly tapered threads 64 are provided inside the locking element 58. When the locking element 58 is tightly threaded onto the tapered threads 57 of the adapter 56, the tapering of the threads 57, 64 causes squeezing of the gasket 62 between the adapter 56 and the tool body 14, thereby providing a tight hermetic seal.

As shown in FIG. 1, the cryogenic tool 10 preferably includes a reducer 66 (e.g., made of copper) at the exhaust port 34. The reducer 66 has a flange 68 which abuts and is fastened to a flange 70 of a blind pipe 72. A gasket 74 preferably is sandwiched between the two flanges 68 and 70.

The blind pipe 72 has an exhaust pipe 76 which receives the cryogenic fluid from the reducer 66 and transmits it to a recovery system or otherwise expels the cryogenic fluid. The exhaust control valve 38 preferably is located along the exhaust pipe 76.

The blind pipe 72 also includes an inlet passage 78 for a cryogenic inlet 80. The cryogenic inlet 80 has a fluid coupling 82 for connection to the source of cryogenic fluid 30 and communicates the cryogenic fluid to the conduit 26.

Notably, the illustrated tool 10 is capable of freezing the content of the pipe 12. It does not require a separate plug or a filler fluid for the plug. This represents of a significant advance over conventional arrangements and techniques which require insertion of an expandable plug into the pipe, and especially those which require subsequent freezing of a filler fluid which is injected into the plug and also those which require the filler fluid to be different from the fluid which is normally carried by the pipe.

In addition to the cryogenic tool 10, the present invention also provides a method of freezing a content of a pipe to prevent flow through the pipe. While the method will be described hereinafter with reference to the preferred cryogenic tool 10 shown in FIGS. 1 and 2, it is understood that the method is not limited to use in conjunction with the illustrated tool 10.

A preferred implementation of the method comprises the steps of: inserting a thermally conductive tip 18 of a cryogenic tool 10 through a wall 20 of a pipe 12 so that the cryogenic tool 10 extends into the content 22; and applying a cryogenic fluid to the conductive tip 18 so that heat from the content 22 of the pipe 12 is transferred through the tip 18 to the cryogenic fluid, to vaporize the cryogenic fluid.

Preferably, the step of inserting the thermally conductive tip includes the steps of: applying a valve 44 to the pipe 12 at a location where the thermally conductive tip 18 is to be inserted; opening a hole in the wall 20 of the pipe 12 using a hole opening device (e.g., a drill) (not shown) which is operated through the valve 44 while the valve 44 is open; closing the valve 44 after the hole is opened; placing the thermally conductive tip 18 against the valve 44; opening the valve 44 to permit passage of the thermally conductive tip 18; and inserting the thermally conductive tip 18 through the valve 44, through the hole in the wall 20, and into the content 22 of the pipe 12. The thermally conductive tip 18 then is advanced a predetermined distance transversely into the pipe 12. Once the predetermined distance is achieved, the thermally conductive tip 18 is locked into position by locking of the locking element 58 (e.g., by tightening of the fastener 60).

Preferably, the penetration range into the pipe 12 is maximized by advancing the thermally conductive tip 18 diametrically through the content 22 of the pipe 12.

In performing the step of applying a cryogenic fluid to the conductive tip 18, the cryogenic fluid preferably is discharged into the thermally conductive tip 18 from a conduit 26 of smaller cross-sectional area than the thermally conductive tip 18, whereby the cryogenic fluid undergoes expansion at the thermally conductive tip 18.

After expansion and absorption of heat from the content 22 at the tip 18, the cryogenic fluid preferably is expelled (e.g., out through exhaust port 34) so that a flow of cryogenic fluid is established into the tip 18 and then away from the tip 18. The cryogenic fluid preferably is discharged away from the pipe 12.

The application of cryogenic fluid preferably is performed so that a sufficient amount of heat is transferred away from the content 22 that the content 22 itself freezes to form a plug at the thermally conductive tip 18. The plug preferably prevents the content 22 from flowing through the pipe.

Once the flow of content 22 through the pipe 12 stops, it is possible to perform repairs on the pipe 12. If the pipe 12 is part of a grid-type distribution system, the method of the present invention can be repeated on the pipe 12 at an opposite side of the repair site from where the method was first performed. As a result, the pipe 12 is plugged at opposites sides of the repair site, by its own frozen contents 22.

Once a repair or other task for which the pipe 12 was plugged is completed, or alternatively, after the freezing of the contents 22 is sufficient that the pipe 12 will remain plugged for a period of time sufficient to complete the task or repair, the application of cryogenic fluid to the tip 18 is terminated. The content 22 then is permitted to thaw. Thawing may be accelerated, as desired, by the application of heat or otherwise.

The thermally conductive tip 18 may be withdrawn from the pipe 12 before, during or after such thawing. Preferably, the valve 44 is closed after withdrawal of the tip 18 to prevent the content 22 of the pipe 12 from spilling out through the hole in the wall 20 of the pipe 12.

A preferred sequence of the method will now be described. It will be appreciated, however, that the present invention is not limited to the exemplary sequence of steps.

Initially, a wet-tap 54 is secured to the pipe 12 by welding or otherwise. Next, the valve 44 is threaded onto the wet tap 54. The valve 44 then is opened, and a drill or other hole opening device is inserted through the valve 44. The drill or other hole opening device then is activated to create a hole in the wall 20 of the pipe 12. The drill or other device then is withdrawn just past the ball 46 of the valve 44. As the ball 46 is passed, the valve 44 is closed to prevent leakage from the pipe 12. The adapter 56 then is threaded onto the valve 44, and the locking element 58 is threaded to the adapter 56 so that the gasket 62 is squeezed between the tool body 14 and the adapter 56. The tip 18 of the tool body 14 then can be advanced into the valve 44.

As the tip 18 reaches the ball 46, the valve 44 is opened. The tip 18 then is advanced through the valve 44, through the hole in the wall 20 of the pipe 12, and into the content 22 of the pipe 22. Notably, this all occurs without significant, if any, spillage of the content 22.

Once the tip 18 has been advanced a predetermined distance into the content 22 (preferably the entire diametric distance through the content 22), the cryogenic fluid is applied to the tip 18. As the fluid absorbs heat, expands, and vaporizes, heat is transferred away from the content 22 and out through the exhaust port 34. The content 22 therefore freezes to provide a flow-obstructing plug.

If the pipe 12 is part of a grid-like distribution system or there is some other reason why it would be desirable to bidirectionally isolate the repair site on the pipe 12, the same or a similar sequence of steps can be repeated on the pipe 12 at a location opposite the repair site from the first location.

The present invention thus provides relatively safe, convenient, and low-cost tools and methods for isolating a repair site in a fluid distribution system.

While the illustrated embodiment and aformentioned preferred implementation of the method tend to operate most efficiently when the content 22 of the pipe 12 is not flowing, it will be appreciated that the tip 18 can transfer heat sufficiently fast to the cryogenic fluid that freezing can be achieved even if there is some flow of the content 22, for example, because of a leak. This represents a significant advance over conventional arrangements which are incapable of transferring heat so rapidly out from the content 22.

While this invention has been described as having a preferred design, it is understood that the invention is not limited to the illustrated and described features. To the contrary, the invention is capable of further modifications, usages, and/or adaptations following the general principles of the invention and therefore includes such departures from the present disclosure as come within known or customary practice in the art to which the invention pertains, and as may be applied to the central features set forth above, and which fall within the scope of the appended claims.

I claim:

1. A cryogenic tool for freezing a pipe content which otherwise flows through the pipe, comprising:

a tool body having a tip which is adapted for insertion through a wall of the pipe, said tip being of sufficient length to extend entirely through the wall of the pipe and into the pipe content; and a cryogenic device connected to the tip, the cryogenic device being adapted to reduce the temperature of said tip sufficiently to freeze the content of said pipe in the vicinity of said tip.

2. The cryogenic tool of claim 1, further comprising an expansion device located at said tip, said cryogenic device being adapted to provide cryogenic fluid to said expansion device, where said cryogenic fluid expands and absorbs heat transferred through said tip from said content of the pipe, to thereby freeze said content.

3. The cryogenic tool of claim 1, wherein said cryogenic device includes a conduit having a proximal portion and a distal portion, said proximal portion being connectable to a source of cryogenic fluid, said conduit being arranged so as to communicate said cryogenic fluid to said distal portion, said distal portion having at least one opening through which said cryogenic fluid is discharged into the tip for vaporization and absorption of heat therein.

4. The cryogenic tool of claim 3, wherein said tool body is hollow and has an exhaust port through which said cryogenic fluid exits after being discharged into the tip and absorbing heat therefrom.

5. The cryogenic tool of claim 4, wherein said exhaust port is located away from said tip on the tool body.

6. The cryogenic tool of claim 3, wherein said conduit is substantially contained within the tool body.

7. The cryogenic tool of claim 3, wherein said distal end of the conduit is located at said tip of the tool body.

8. The cryogenic tool of claim 3, wherein said tip is made of thermally conductive material which facilitates transfer of heat from said content to said cryogenic fluid which is discharged into said tip.

9. The cryogenic tool of claim 3, wherein said cryogenic fluid is liquid nitrogen.

10. The cryogenic tool of claim 3, further comprising a fluid control valve connected to said conduit, said fluid control valve being operable to selectively open, restrict, and close said conduit to flow of said cryogenic fluid.

11. The cryogenic tool of claim 3, wherein said tip is closed to prevent said cryogenic fluid from contaminating said content of the pipe.

12. The cryogenic tool of claim 1, further comprising an attachment mechanism capable of securely attaching said tool body to the pipe.

13. The cryogenic tool of claim 12, wherein said attachment mechanism includes a valve which is actuatable between open and closed positions, said open position providing access through said valve to an opening in the wall of the pipe, said closed position blocking said access through said valve to the opening in the wall of the pipe.

14. The cryogenic tool of claim 12, wherein said tool body is telescopically connected to the attachment mechanism.

15. The cryogenic tool of claim 14, further comprising a locking element operatively connected between the tool body and the attachment mechanism, said locking element being adapted to selectively lock the tool body in a positional relationship with said attachment mechanism after such a positional relationship is telescopically achieved.

16. The cryogenic tool of claim 1, wherein said tip is diametrically movable into the pipe and has sufficient length to span an interior diameter of said pipe.

17. The cryogenic tool of claim 1, wherein said cryogenic device is adapted to reduce the temperature of said tip sufficiently to freeze said content and completely block flow through said pipe.

18. The cryogenic tool of claim 1, wherein said tool body is configured so that the extent to which said tool body extends into the pipe is adjustable to accommodate pipes having different diameters.

19. A cryogenic tool for freezing a pipe content which otherwise flows through the pipe, comprising:

an elongated tool body having a hollow tip formed of thermally conductive material, said tip being adapted for insertion through a wall of the pipe and having sufficient length to extend entirely through the wall of the pipe and into the pipe content; and a cryogenic device connected to the hollow tip, for transmitting a cryogenic fluid through a conduit into said hollow tip, said hollow tip having a larger cross-sectional area than said conduit, whereby said cryogenic fluid expands during entry into said hollow tip and absorbs sufficient heat from said content via thermal conduction through said thermally conductive material to freeze said content of said pipe in the vicinity of said tip and thereby form a plug of said content which prevents flow through the pipe.

20. The cryogenic tool of claim 19, wherein said tool body has an exhaust port located away from said tip, through which said cryogenic fluid exits after being discharged into the hollow tip.

21. The cryogenic tool of claim 19, wherein said conduit is substantially contained within the tool body.

22. The cryogenic tool of claim 19, further comprising an attachment mechanism capable of securely attaching said tool body to the pipe.

23. The cryogenic tool of claim 22, wherein said attachment mechanism includes a valve which is actuatable between open and closed positions, said open position providing access through said valve to an opening in the wall of the pipe, said closed position blocking said access through said valve to the opening in the wall of the pipe.

24. The cryogenic tool of claim 22, wherein said tool body is telescopically connected to the attachment mechanism.

25. The cryogenic tool of claim 24, further comprising a locking element operatively connected between the tool body and the attachment mechanism, said locking element being adapted to selectively lock the tool body in a positional relationship with said attachment mechanism after such a positional relationship is telescopically achieved.

26. The cryogenic tool of claim 19, wherein said tip is diametrically movable into the pipe and has sufficient length to span an interior diameter of said pipe.

27. The cryogenic tool of claim 19, wherein said tool body is configured so that the extent to which said tool body extends into the pipe is adjustable to accommodate pipes having different diameters.

28. The cryogenic tool of claim 19, wherein said tip is closed to prevent said cryogenic fluid from contaminating said content of the pipe.

29. A method of freezing a content of a pipe to prevent flow through the pipe, said method comprising the steps of:

inserting a thermally conductive tip of a cryogenic tool through a wall of said pipe so that said cryogenic tool extends into said content; and applying a cryogenic fluid to said conductive tip so that heat from said content of the pipe is transferred through the tip to the cryogenic fluid, to vaporize said cryogenic fluid.

30. The method of claim 29, wherein said step of inserting the thermally conductive tip includes the steps of:

applying a valve to the pipe at a location where said thermally conductive tip is to be inserted;

opening a hole in the wall of said pipe using a hole opening device which is operated through said valve while said valve is open;

closing said valve after said hole is opened;

placing said thermally conductive tip against the valve;

opening the valve to permit passage of said thermally conductive tip; and inserting the thermally conductive tip through the valve, through the hole, and into the content of the pipe.

31. The method of claim 30, wherein said step of inserting the thermally conductive tip further includes the step of advancing the thermally conductive tip a predetermined distance transversely into said pipe.

32. The method of claim 31, further comprising the step of selectively locking a position of said thermally conductive tip when said predetermined distance is achieved.

33. The method of claim 31, wherein said step of advancing the thermally conductive tip is performed so that said thermally conductive tip extends diametrically through said content of the pipe.

34. The method of claim 29, wherein said step of applying a cryogenic fluid to said conductive tip includes the step of discharging said cryogenic fluid into said thermally conductive tip from a conduit of smaller cross-sectional area than said thermally conductive tip, whereby said cryogenic fluid undergoes expansion at said thermally conductive tip.

35. The method of claim 34, further comprising the step of expelling said cryogenic fluid after expansion and absorption of heat at said thermally conductive tip, so that a flow of cryogenic fluid is established into said tip and then away from said tip after expansion.

36. The method of claim 29, further comprising the step of discharging said cryogenic fluid away from said pipe.

37. The method of claim 29, wherein said step of applying a cryogenic fluid to said conductive tip is performed so that a sufficient amount of heat is transferred away from said content that said content freezes to form a plug of said content at said thermally conductive tip.

38. The method of claim 37, wherein said plug prevents said content from flowing through the pipe.

39. The method of claim 29, further comprising the steps of:

terminating application of said cryogenic fluid to permit said content to thaw; and withdrawing said thermally conductive tip from the pipe.

* * * * *